United States Patent
Wang et al.

(10) Patent No.: US 10,611,032 B2
(45) Date of Patent: Apr. 7, 2020

(54) MEASUREMENT SYSTEM

(71) Applicant: Fanuc Corporation, Yamanashi (JP)

(72) Inventors: Yuelai Wang, Yamanashi (JP); Soichi Arita, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 77 days.

(21) Appl. No.: 16/131,485

(22) Filed: Sep. 14, 2018

(65) Prior Publication Data

US 2019/0091867 A1    Mar. 28, 2019

(30) Foreign Application Priority Data

Sep. 26, 2017 (JP) ................................. 2017-184732

(51) Int. Cl.
   *B25J 9/16* (2006.01)
   *G01S 17/06* (2006.01)
   *G01B 11/00* (2006.01)
   *B25J 19/02* (2006.01)

(52) U.S. Cl.
   CPC ........... *B25J 9/1692* (2013.01); *B25J 19/022* (2013.01); *G01B 11/002* (2013.01); *G01S 17/06* (2013.01);
   (Continued)

(58) Field of Classification Search
   CPC ...... B25J 9/1692; B25J 9/1694; B25J 9/1697; B25J 19/0095; B25J 19/021; B25J 19/022;
   (Continued)

(56) References Cited

U.S. PATENT DOCUMENTS

| | | | | |
|---|---|---|---|---|
| 4,788,440 A | * | 11/1988 | Pryor | .................... A01B 69/008 250/559.33 |
| 2002/0038855 A1 | * | 4/2002 | Hwang | .................. B25J 9/1692 250/559.29 |

(Continued)

FOREIGN PATENT DOCUMENTS

| EP | 2202482 A1 | 6/2010 |
|---|---|---|
| JP | H10-085937 A | 4/1998 |

(Continued)

OTHER PUBLICATIONS

Inagaki, Koji; Notice of Reasons for Refusal for Japanese Application No. 2017-184732; dated Jun. 25, 2019; 2 pages.

(Continued)

*Primary Examiner* — Spencer D Patton
(74) *Attorney, Agent, or Firm* — Winstead PC

(57) ABSTRACT

A measurement system including: reflectors mounted on a robot; a measuring apparatus including a laser head, wherein the measuring apparatus includes a controller, the controller is configured to conduct: a coordinate relationship acquisition process for acquiring a position and a direction of a measuring-apparatus coordinate system with respect to a robot coordinate system by emitting a laser beam from the laser head toward reference reflection portions provided in a base portion of the robot, and based on a reflected light; and a head drive control process which controls a direction of the laser head by receiving coordinate data of the reflector recognized by a controller of the robot, and by making a control command to change the direction of the laser head using the coordinate data which is received and the position and the direction of the measuring-apparatus coordinate system with respect to the robot coordinate system.

1 Claim, 5 Drawing Sheets

(52) U.S. Cl.
CPC .............. *G05B 2219/39022* (2013.01); *G05B 2219/39024* (2013.01)

(58) Field of Classification Search
CPC ... G01C 15/002; G01B 11/002; G01S 17/003; G01S 17/06; G01S 17/42; G01S 17/66; G01S 17/86; G01S 7/497; G05B 2219/37571; G05B 2219/39024; G05B 2219/33263; G05B 2219/39022; G05B 19/4086

See application file for complete search history.

(56) References Cited

U.S. PATENT DOCUMENTS

| | | |
|---|---|---|
| 2008/0216552 A1 | 9/2008 | Ibach et al. |
| 2009/0177438 A1 | 7/2009 | Raab |
| 2017/0016712 A1 | 1/2017 | Suzuki |

FOREIGN PATENT DOCUMENTS

| | | |
|---|---|---|
| JP | H11-110027 A | 4/1999 |
| JP | 2001-038662 A | 2/2001 |
| JP | 2001-050741 A | 2/2001 |
| JP | 2002-103259 A | 4/2002 |
| JP | 2006-181591 A | 7/2006 |
| JP | 2008-547026 A | 12/2008 |
| JP | 5608074 B2 | 10/2014 |
| JP | 2016-078173 A | 5/2016 |
| JP | 2017-019072 A | 1/2017 |
| WO | WO-2007002319 A1 | 1/2007 |

OTHER PUBLICATIONS

General Industrial Property Cooperation Center; Search Report by Registered Search Organization for Japanese Application No. 2017-184732; dated Jun. 3, 2019; 8 pages.

* cited by examiner

MEASUREMENT SYSTEM

CROSS-REFERENCE TO RELATED APPLICATIONS

This application is based on and claims priority to Japanese Patent Application No. 2017-184732 filed on Sep. 26, 2017, the entire content of which is incorporated herein by reference.

TECHNICAL FIELD

The present invention relates to a measurement system, and more particularly to a measurement system which is used for performing calibration of the position of a distal end portion of a robot.

BACKGROUND ART

Recently, the tasks a robot is to perform (operations of the robot) at an actual place of installation are set by off-line teaching so as to shorten the time required for setting the robot at the actual place of installation.

In the off-line teaching, a model of the robot, a model of equipment around the robot at the place of installation, a model of a workpiece and the like are set in a simulation device, and an operation program for the robot at the place of installation is made in the simulation device.

An actual position of the distal end portion of the robot is slightly different from the position of the distal end portion of the robot which is calculated by the simulation device due to assembly errors, the influence of gravity or the like. Such differences vary depending on the size of the robot, the weight of the workpiece which is manipulated by the robot and the like, and the differences may be approximately 5 mm in some cases. For this reason, when the robot is operated at the place of installation by the operation program, which is made by off-line teaching, without any modifications, failures may occur.

For the reasons above, the difference between the position of the distal end portion of the robot at the place of installation and a position which is intended by the operation program is measured, and correction (calibration) of the operation program is performed based on the measurement result.

A measurement system for measuring the position of a distal end portion of a robot is known, and the system uses a method in which three shafts are fixed at the distal end portion of the robot such that longitudinal axes of the shafts make right angles to each other and, at the same time, reflectors are respectively mounted at both ends of each shaft, and the positions of the reflectors are measured by a measuring apparatus (see PTL 1, for example).

CITATION LIST

Patent Literature

PTL 1

Japanese Unexamined Patent Application, Publication No. 2017-019072

SUMMARY OF INVENTION

A first aspect of the present invention is a measurement system which comprising: a reflector mounted at a distal end portion of a robot; and a measuring apparatus including a laser head which emits a laser beam toward the reflector and receives a reflected light from the reflector, and a head driving device which changes a direction of the laser head, wherein a position of the reflector mounted at the distal end portion of the robot is measured by the measuring apparatus, wherein the measuring apparatus comprises a controller, the controller is configured to conduct: a coordinate relationship acquisition process which acquires a position and a direction of a coordinate system of the measuring apparatus with respect to a robot coordinate system, by emitting the laser beam from the laser head toward a reference reflection portion provided in a base portion of the robot, and based on a reflected light from the reference reflection portion; and a head drive control process which receives, from a control unit for the robot, coordinate data of the reflector, which is recognized by the control unit, the reflector being mounted at the distal end portion of the robot, wherein the control unit transmits, to the head driving device, a control command to change the direction of the laser head using the coordinate data which is received and the position and the direction of the coordinate system of the measuring apparatus with respect to the robot coordinate system.

DESCRIPTION OF EMBODIMENTS

A measurement system 1 according to a first embodiment of the present invention is described hereinafter with reference to drawings.

This measurement system 1 is used for performing calibration of a robot 2.

Figure 1:
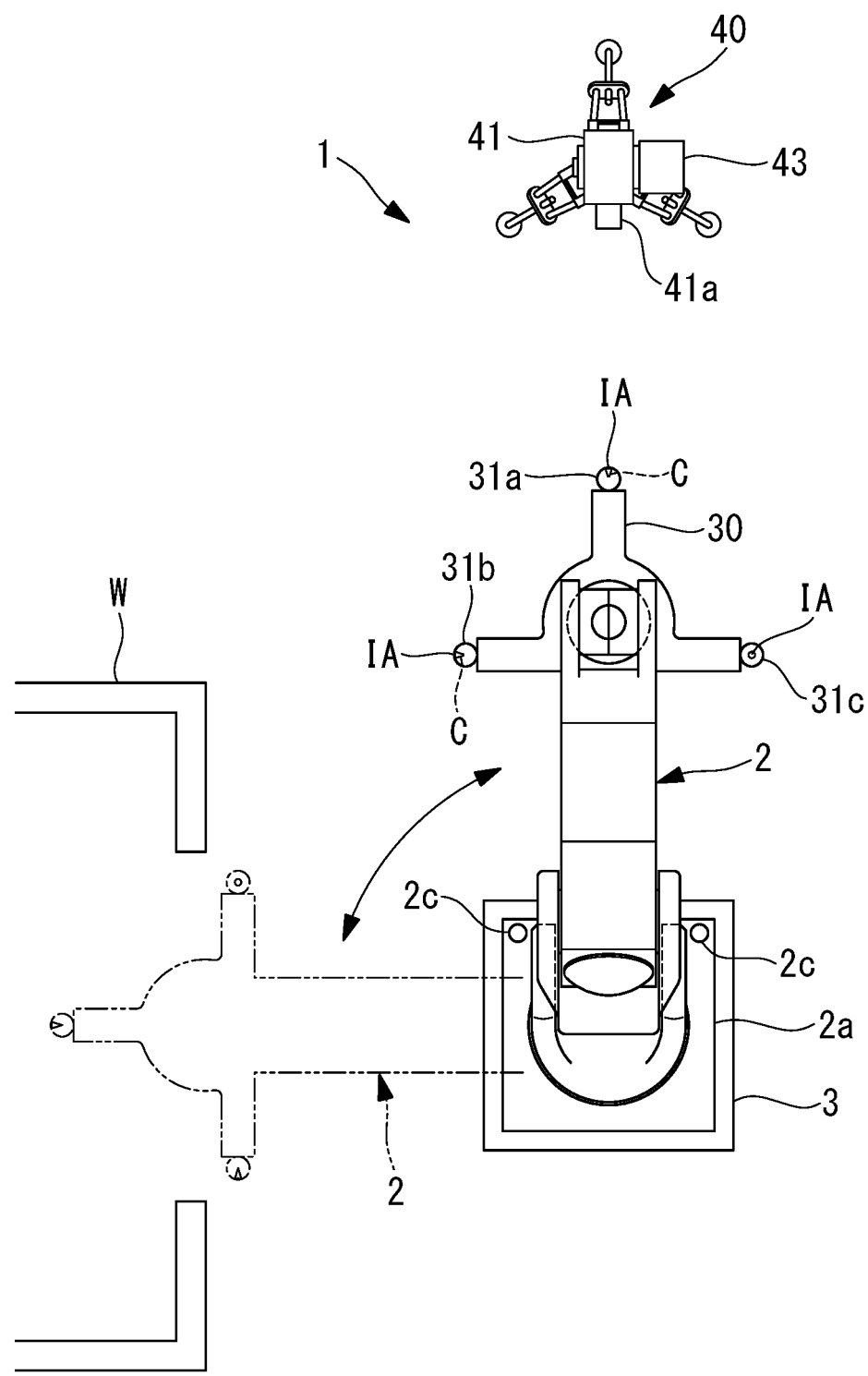
FIG. 1 is a schematic plan view of a measurement system according to an embodiment of the present invention.

The robot 2 performs a predetermined task, such as spot welding to a workpiece W as shown in FIG. 1, for example. The robot 2 includes a plurality of arm members and joints, and also includes a plurality of servo motors 11 for respectively driving the plurality of joints (see FIG. 3). Each servo motor 11 may be formed of a variety of servo motor such as a rotation motor or a linear motor. Each servo motor 11 has an operation position detection device, such as an encoder, which detects an operation position of the servo motor 11, and detected values of the operation position detection devices are transmitted to a robot control apparatus 20.

A processing tool 12 is mounted at a distal end portion of the robot 2, and the processing tool 12 performs spot welding on the workpiece W. When the robot 2 is provided for conveying a workpiece, a chuck a suction device or the like, each of which forms a holding device for holding the workpiece, is mounted at the distal end portion of the robot 2 in place of the processing tool 12.

Figure 2:
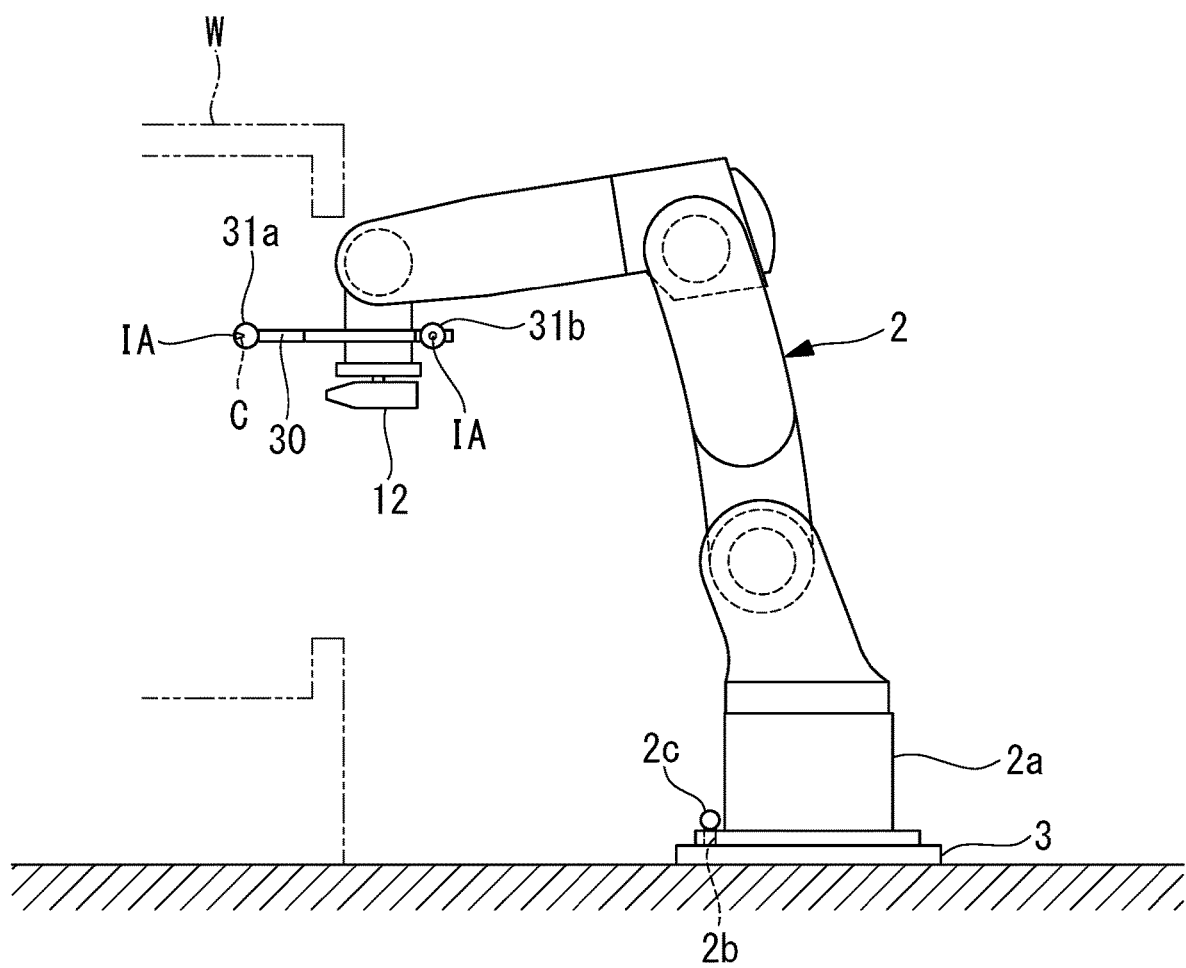
FIG. 2 is a schematic front view of a robot which is measured by the measurement system of this embodiment.

As shown in FIG. 1 and FIG. 2, the robot 2 is finely positioned on a base plate 3 which is accurately positioned. An upper surface of the base plate 3 has a precisely formed flat surface, and is measured at a plurality of positions. Such a measurement allows determination of a horizontal plane of a robot coordinate system of the robot 2 (that is, the flat surface is parallel to an x axis and a y axis of the robot coordinate system).

As shown in FIG. 1 and FIG. 2, reflection members (reference reflection portions) 2c are respectively mounted in two reference holes 2b precisely formed on a base portion 2a of the robot 2. Directions of the x axis and the y axis of the robot coordinate system are set based on positions of the respective reflection members 2c. Further, based on the positions of the respective reflection members 2c and the horizontal plane, a zero point of the robot coordinate system is set at a position slightly above the horizontal plane, and the x axis, the y axis, and the z axis perpendicular to the horizontal plane are set using the zero point as the center.

Figure 3:
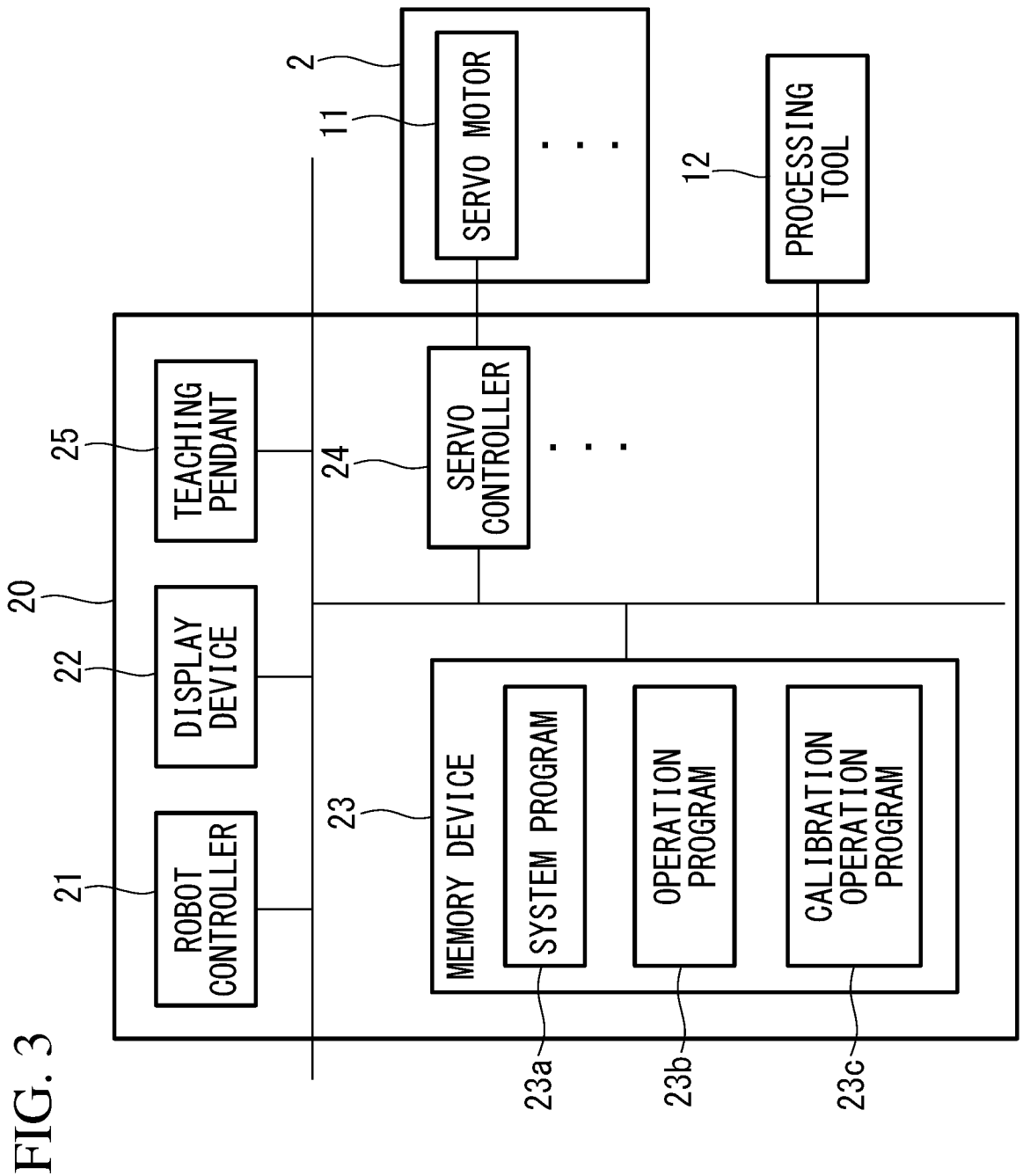
FIG. 3 is a block diagram of the robot which is measured by the measurement system of this embodiment.

As shown in FIG. 3, the robot control apparatus 20 includes, for example: a robot controller 21 having a CPU, a RAM and the like; a display device 22; a memory device 23 having a nonvolatile storage, a ROM and the like; a plurality of servo controllers 24 provided so as to respectively correspond to the servo motors 11 of the robot 2; and a teaching pendant 25 which is connected to the robot control apparatus 20, and can be carried by an operator. The teaching pendant 25 may be configured to perform wireless communication with the robot control apparatus 20.

The memory device 23 stores a system program 23a. The system program 23a is responsible for the basic function of the robot control apparatus 20. The memory device 23 also stores at least one operation program 23b which is made by a simulation device (not shown in the drawing). To be more specific, a model of the robot 2 and a model of the workpiece W shown in FIG. 1 and FIG. 2 are made in the simulation device. The operation program 23b for the robot 2 is made in the simulation device such that the robot 2 performs welding at a plurality of welding points on the inside and outside of the workpiece W while avoiding contact with the workpiece W, and the operation program 23b is stored in the memory device 23. The memory device 23 also stores a calibration operation program 23c.

The robot controller 21 operates in accordance with the system program 23a. In performing welding on the workpiece W, the operation program 23b stored in the memory device 23 is read out, and is temporarily stored in the RAM. Control signals are transmitted to the respective servo controllers 24 according to the operation program 23b which is read out. With such operations, servo amplifiers of the respective servo motors 11 of the robot 2 are controlled, and also emission of a laser beam from the processing tool 12 is controlled so as to perform welding on the workpiece W.

As shown in FIG. 1, FIG. 2, FIG. 4, and FIG. 5, the measurement system 1 includes a plurality of reflectors 31a, 31b, 31c which are mounted at the distal end portion of the robot 2 by a reflector support plate 30, and a measuring apparatus 40. The measurement system 1 also includes a measurement control apparatus 50 shown in FIG. 6. In this embodiment, the measurement control apparatus 50 is incorporated in the measuring apparatus 40. However, the measurement control apparatus 50 may be disposed at another position external to the measuring apparatus 40.

The reflector support plate 30 is formed of a thin metal plate, for example, and is fixed between the distal end portion of the robot 2 and the processing tool 12. Each reflector 31a, 31b, 31c is formed of a spherical member which reflects a laser beam incident on the reflector in a direction substantially equal to a direction along which the laser beam is incident on the reflector. Such a reflection is referred to as retroreflection. Each reflector 31a, 31b, 31c is configured such that the range where retroreflection occurs is limited. A conical shape C is defined to have an apex at the center of the sphere, and an apex angle of 15°, for example, and only a range which falls within the conical shape C is set as an incident range IA where retroreflection is performed.

The diameter of each reflector 31a, 31b, 31c is set to ten and several mm or several mm, and hence the diameter of the incident range IA of each reflector 31a, 31b, 31c is approximately 1 mm to approximately 2 mm. As described above, the incident range IA has a small diameter, and hence calibration of the position of the distal end portion of the robot 2 can be accurately performed. In a task which requires accuracy, such as spot welding, there may be a case where an error is required to be reduced to equal to or less than 1 mm. In such a case, it may be necessary to further reduce the size of the incident range IA.

Figure 4:
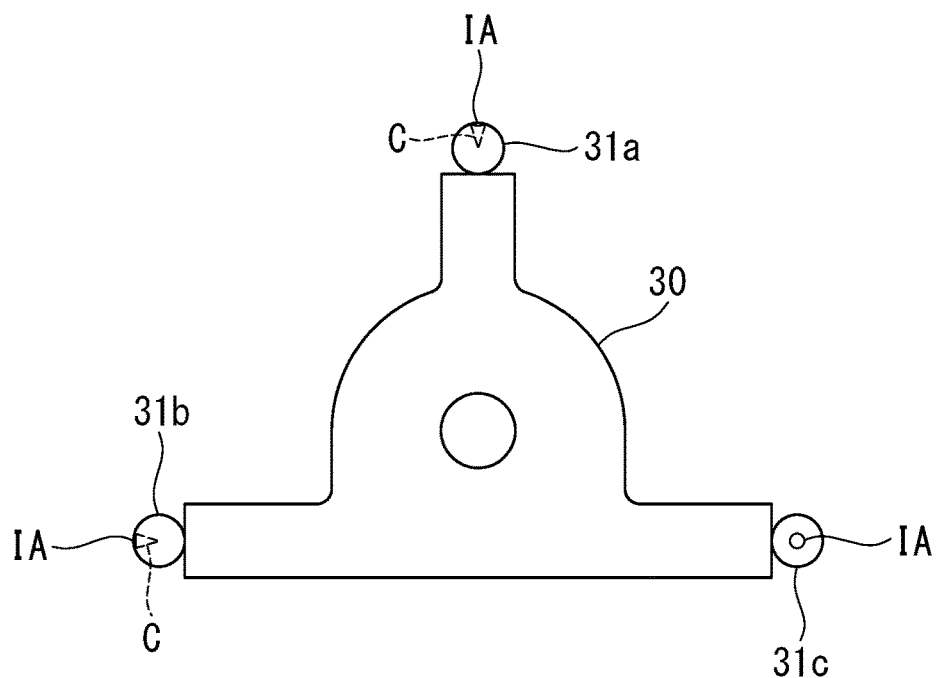
FIG. 4 is a front view of a reflector support plate and reflectors of the measurement system of this embodiment.
Figure 5:
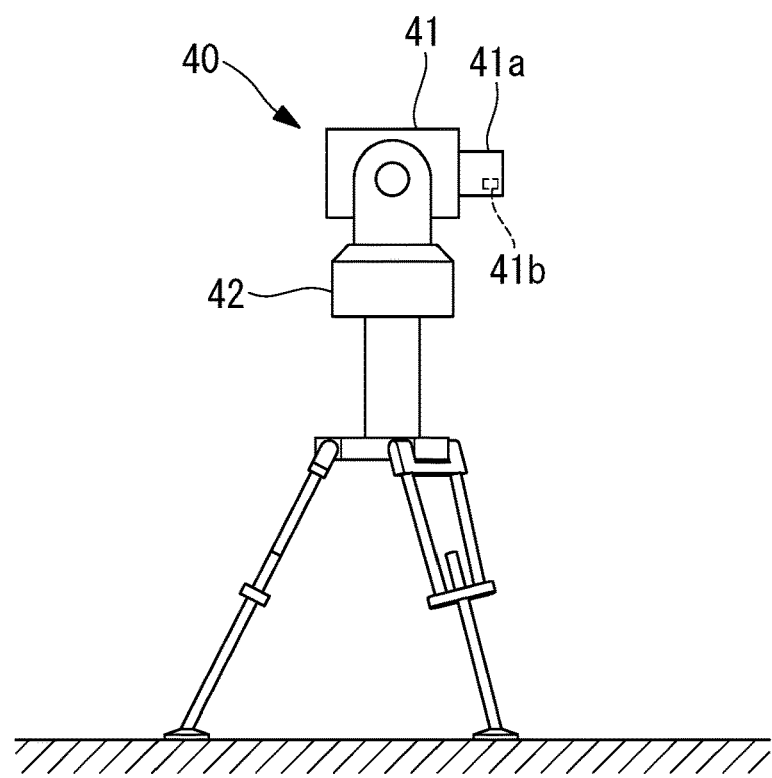
FIG. 5 is a side view of a measuring apparatus of the measurement system of this embodiment.

Further, as shown in FIG. 4, the respective reflectors 31a, 31b, 31c are fixed to the reflector support plate 30 such that optical axes of the incident ranges IA of the respective reflectors 31a, 31b, 31c form angles of 90° to each other. With such a configuration, there is no possibility of a laser beam from the measuring apparatus 40 being reflected simultaneously from the plurality of reflectors 31a, 31b, 31c.

The measuring apparatus 40 includes a laser head 41, a vertical axis motor 42, and a horizontal axis motor 43. The laser head 41 emits a laser beam toward the reflector 31a, 31b, 31c, and receives the reflected light from the reflector 31. The vertical axis motor 42 and the horizontal axis motor 43 form a head driving device which changes a direction of the laser head 41.

The vertical axis motor 42 is provided to rotate the laser head 41 and the horizontal axis motor 43 about a vertical axis, and the horizontal axis motor 43 is provided to rotate the laser head 41 about a horizontally axis. The vertical axis motor 42 and the horizontal axis motor 43 are connected to the measurement control apparatus 50, and the vertical axis motor 42 and the horizontal axis motor 43 are controlled by the measurement control apparatus 50. Further, each motor 42, 43 has an operation position detection device, such as an encoder, which detects an operation position of the motor 42, 43, and detected values of the operation position detection devices are transmitted to the measurement control apparatus 50.

A laser beam emitting section 41a is provided in the laser head 41, and configured such that a laser beam from a laser oscillator (not shown in the drawing) is emitted from the laser beam emitting section 41a. Further, a light receiving sensor 41b is disposed in the laser beam emitting section 41a of the laser head 41, and the light receiving sensor 41b receives the reflected light which is reflected from the reflector. The laser head 41 is connected to the measurement control apparatus 50. The measurement control apparatus 50 controls emission of a laser beam from the laser beam emitting section 41a of the laser head 41. A detection result of the light receiving sensor 41b of the laser head 41 is transmitted to the measurement control apparatus 50.

Figure 6:
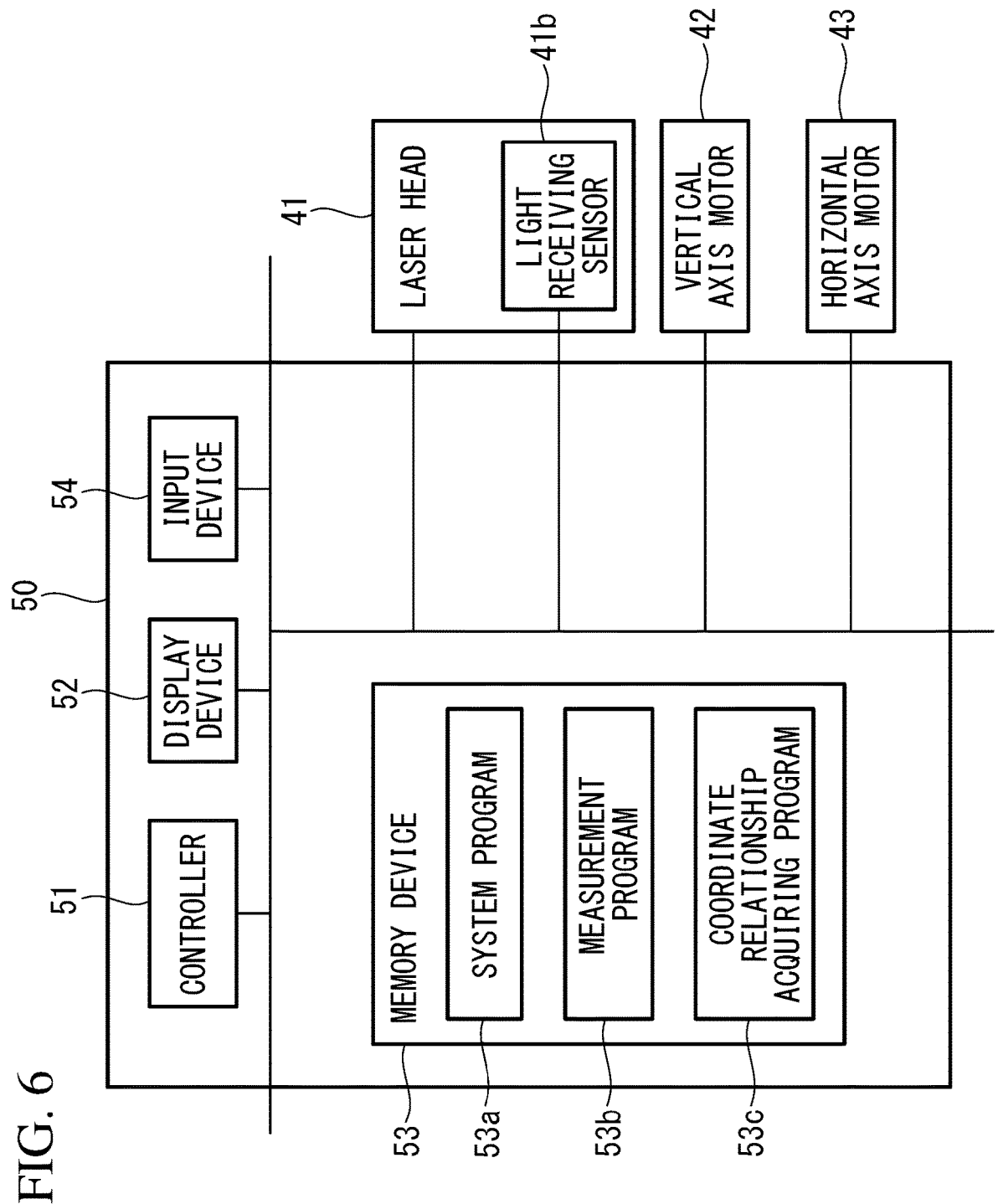
FIG. 6 is a block diagram of the measuring apparatus used in this embodiment.

As shown in FIG. 6, the measurement control apparatus 50 includes, for example: a controller 51 having a CPU, a RAM and the like; a display device 52; a memory device 53 having a nonvolatile storage, a ROM and the like; and an input device 54. The input device 54 may be configured to perform wireless communication with the measurement control apparatus 50.

The memory device 53 stores a system program 53a. The system program 53a is responsible for the basic functions of the measurement control apparatus 50. The memory device 53 also stores a measurement program (head drive control means) 53b, and a coordinate relationship acquiring program (coordinate relationship acquisition means) 53c. The measurement program 53b measures the positions of the reflectors 31a, 31b, 31c mounted at the distal end portion of the robot 2. The coordinate relationship acquiring program 53c acquires a corresponding relationship of a measuring-apparatus coordinate system, which is a coordinate system of the measuring apparatus 40, with respect to a robot coordinate system, which is a coordinate system of the robot 2.

An operation of the controller 51 when acquiring the corresponding relationship of the measuring-apparatus coordinate system and the robot coordinate system is described. The measuring apparatus 40 is installed at an approximate position for measurement. For example, when the controller 51 receives a request signal which is inputted by the input device 54 or the like and which requests a corresponding relationship of the coordinate systems, the controller 51 is operated by the coordinate relationship acquiring program 53c. With such an operation, a laser beam is emitted from the laser head 41 to the respective reflection members (reference reflection portions) 2c mounted in two reference holes 2b formed on the base portion 2a of the robot 2, and the reflected light from each reflection member 2c is received by the light receiving sensor 41b. Positions of the respective reflection members 2c with respect to the measuring apparatus 40 are measured in this manner.

In this embodiment, adjusting the direction of the laser head 41 by the controller 51 using the vertical axis motor 42 and the horizontal axis motor 43 may allow a laser beam to irradiate the respective reflection members 2c from the laser head 41. Alternatively, manually adjusting the direction of the laser head 41 by an operator may allow a laser beam to irradiate the respective reflection members 2c from the laser head 41.

Subsequently, the controller 51 acquires the position of a zero point of the measuring-apparatus coordinate system with respect to the zero point of the robot coordinate system based on the measured positions of the respective reflection members 2c, and also acquires respective directions (gradients) of the x axis and the y axis of the measuring-apparatus coordinate system with respect to the x axis and the y axis of the robot coordinate system. With such operations, the corresponding relationship (the position and the direction) of the measuring-apparatus coordinate system and the robot coordinate system can be acquired. It may be configured to acquire respective directions (gradients) of the x axis, the y axis, and the z axis of the measuring-apparatus coordinate system with respect to the x axis, the y axis, and the z axis of the robot coordinate system.

Subsequently, an operation of the robot controller 21 and the controller 51 when performing calibration is described below. When the robot controller 21 and the controller 51 receive a predetermined trigger signal, for example, a calibration request signal which is inputted by the input device 54 or the like, the robot controller 21 reads out the calibration operation program 23c, and transmits control signals to the respective servo controllers 24 according to the calibration operation program 23c which is read out. With such operations, servo amplifiers of the respective servo motors 11 of the robot 2 are controlled.

In this embodiment, the calibration operation program 23c sequentially arranges the distal end portion of the robot 2 at several tens to several hundreds of measurement positions which are set in advance. The several tens to several hundreds of measurement positions are preferably positions disposed on a trajectory on which the distal end portion of the robot 2 is moved by the operation program 23b. To make an operation of the robot 2 which takes various types of posture close to an operation of the robot 2 in the simulation device as much as possible, it is preferable to perform the measurement at many measurement positions as described above so as to perform calibration. The posture of the distal end portion of the robot 2 also varies corresponding to a measurement position.

In this embodiment, each measurement position is set such that the incident range IA of any one of the reflectors 31a, 31b, 31c is directed toward the measuring apparatus 40 side. Each time the distal end portion of the robot 2 is arranged at each measurement position, the robot controller 21 transmits the number of the reflector out of the reflectors 31a, 31b, 31c which has the incident range IA directed toward the measuring apparatus 40 side, and transmits position coordinates of the reflector to the measuring apparatus 40. The robot controller 21 may transmit the numbers of the reflectors and position coordinates of the reflectors at several tens to several hundreds of respective measurement positions to the measuring apparatus 40 at one time, and also the measurement positions may be transmitted to the measuring apparatus 40 each time the distal end portion of the robot 2 is arranged at each measurement position. Transmission of the number of a reflector is not always necessary.

Subsequently, the controller 51 is operated by the measurement program 53b, and when the controller 51 receives the number of the reflector and the position coordinates of the reflector (controller coordinate data) from the robot controller 21, the controller 51 converts the position coordinates into position coordinates of the measuring-apparatus coordinate system based on the corresponding relationship of the measuring-apparatus coordinate system with respect to the robot coordinate system. Further, the controller 51 makes a control command to operate the vertical axis motor 42 and the horizontal axis motor 43 such that the laser beam emitting section 41a is directed toward the converted position coordinates. The vertical axis motor 42 and the horizontal axis motor 43 are controlled in response to the control command, and also a laser beam is emitted from the laser head 41.

When the light receiving sensor 41b of the laser head 41 receives the reflected light, measured position coordinates of the reflector on which the laser beam is irradiated are acquired using an elevation angle and a swing angle of the laser head 41 at the time of receiving the reflected light, and a distance between the measuring apparatus 40 and the reflector on which the laser beam is irradiated. The distance is acquired based on a phase or the like of the reflected light which the light receiving sensor 41b receives. The acquired measured position coordinates are transmitted to the robot controller 21. The elevation angle and the swing angle are acquired based on detected values of the operation position detection devices which are respectively incorporated in the vertical axis motor 42 and the horizontal axis motor 43, for example. It may be configured such that the measured position coordinates are converted into position coordinates of the robot coordinate system based on a corresponding relationship of the measuring-apparatus coordinate system and the robot coordinate system, and the converted measured position coordinates are transmitted to the robot controller 21.

Subsequently, the robot controller 21 receives the measured position coordinates or the converted measured position coordinates from the controller 51. Then, the robot controller 21 acquires the difference between the measured position coordinates or the converted measured position coordinates and the position coordinates of the reflector which are transmitted to the controller 51 by the robot controller 21. The robot controller 21 corrects the operation program 23*b* based on the difference. With such operations, calibration of the robot 2 can be performed on the operation program 23*b*.

As described above, according to this embodiment, a laser beam is emitted from the laser head 41 toward the reflection members (reference reflection portions) 2*c* provided to the base portion 2*a* of the robot 2, and the reflected light is received, thus acquiring the position and the direction of the measuring-apparatus coordinate system with respect to the coordinate system of the robot 2. With such operations, it is possible to accurately determine the position and the direction of the measuring-apparatus coordinate system with respect to the robot coordinate system which is finely set. That is, the measured position coordinates of the reflector which are measured by the measuring apparatus can be made to accurately correspond to the robot coordinate system and hence, accurate calibration can be performed.

The direction of the laser head 41 is changed using controller coordinate data of the reflector 31*a*, 31*b*, 31*c*, which is recognized by the robot control unit 20, and the coordinate data is received from the robot control unit 20. In making a control command to change the direction of the laser head 41 using the coordinate data, the position and the direction of the measuring-apparatus coordinate system with respect to the robot coordinate system are accurately determined and hence, a laser beam from the laser head 41, where the direction is set using the coordinate data, is made to accurately irradiate a position within the incident range IA of the reflector 31*a*, 31*b*, 31*c*, or is made to irradiate a position close to the incident range IA.

When a laser beam is made to irradiate the position close to the incident range IA, for example, the laser head 41 is made to perform a search operation. In the search operation, scanning is performed such that the irradiation position of the laser beam traces a circle, and the diameter of the circle gradually increases. Particularly, when the diameter of the incident range IA of the reflector 31*a*, 31*b*, 31*c* is reduced so as to more accurately perform calibration of the position of the distal end portion of the robot 2, the search operation is performed in many cases. On the other hand, in this embodiment, the position and the direction of the measuring-apparatus coordinate system with respect to the robot coordinate system are accurately determined and hence, the time required for performing the search operation can be shortened.

When a laser beam is made to irradiate the position close to the incident range IA, the following configuration may be adopted. A visual sensor provided to the measuring apparatus 40 images the irradiation direction of the laser beam, and image data is subjected to image processing, thus acquiring a positional relationship between the position of the laser beam and the incident range IA. Based on the acquired positional relationship, the controller 51 controls the vertical axis motor 42 and the horizontal axis motor 43 such that a laser beam falls within the incident range IA.

In this embodiment, the reference reflection portions 2*c* used for setting the robot coordinate system are also used for acquiring the position and the direction of the measuring-apparatus coordinate system with respect to the robot coordinate system. Accordingly, the position and the direction of the measuring-apparatus coordinate system with respect to the robot coordinate system can be more accurately determined.

The following aspects of the present invention are derived from the aforementioned disclosure.

A first aspect of the present invention is a measurement system which having: a reflector mounted at a distal end portion of a robot; and a measuring apparatus including a laser head which emits a laser beam toward the reflector and receives a reflected light from the reflector, and a head driving device which changes a direction of the laser head, wherein a position of the reflector mounted at the distal end portion of the robot is measured by the measuring apparatus, the measurement system comprising: a coordinate relationship acquisition section which acquires a position and a direction of a coordinate system of the measuring apparatus with respect to a robot coordinate system by emitting the laser beam from the laser head toward a reference reflection portion provided in a base portion of the robot and by receiving a reflected light from the reference reflection portion; and a head drive control section which receives, from a control unit for the robot, coordinate data of the reflector, which is recognized by the control unit, the reflector being mounted at the distal end portion of the robot, wherein the control unit transmits, to the head driving device, a control command to change the direction of the laser head using the coordinate data which is received and the position and the direction of the coordinate system of the measuring apparatus with respect to the robot coordinate system.

The coordinate system of the robot is finely set when installing the robot. Accordingly, as described in the above-mentioned aspect, a laser beam is emitted from the laser head toward the reference reflection portion provided to the base portion of the robot, and the reflected light is received, thus acquiring the position and the direction of the coordinate system of the measuring apparatus with respect to the coordinate system of the robot. With such operations, it is possible to accurately determine the position and the direction of the coordinate system of the measuring apparatus with respect to the robot coordinate system which is finely set. That is, the measured position coordinates of the reflector which are measured by the measuring apparatus can be made to accurately correspond to the robot coordinate system and hence, accurate calibration can be performed.

The direction of the laser head is changed using coordinate data of the reflector, which is recognized by the control unit for the robot, and the coordinate data is received from the robot control apparatus. When making a control command to change the direction of the laser head using the coordinate data, the position and the direction of the coordinate system of the measuring apparatus with respect to the robot coordinate system are accurately determined and hence, a laser beam from the laser head, where the direction is changed in response to the control command, is made to accurately irradiate a position within an incident range of the reflector, or is made to irradiate a position close to the incident range.

When the laser beam is made to irradiate the position close to the incident range, for example, the laser head is made to perform a search operation. In the search operation, scanning is performed such that the irradiation position of the laser beam traces a circle. Particularly, when the diameter of the incident range of the reflector is reduced so as to more accurately perform calibration of the position of the distal end portion of the robot, the search operation is performed in many cases. On the other hand, in the above-mentioned aspect, the position and the direction of the coordinate system of the measuring apparatus with respect to the robot coordinate system are accurately determined and hence, the time required for performing the search operation can be shortened.

In the above-mentioned aspect, the reference reflection portion is preferably used for setting the robot coordinate system when installing the robot.

In the above-mentioned aspect, the reference reflection portion used for setting the robot coordinate system is also used for acquiring the position and the direction of the coordinate system of the measuring apparatus with respect to the robot coordinate system. Accordingly, the position and the direction of the coordinate system of the measuring apparatus with respect to the robot coordinate system can be more accurately determined.

According to the aforementioned aspects, the time required for performing calibration can be shortened and, further, accurate calibration can be performed.

REFERENCE SIGNS LIST 1 measurement system
2 robot
2c reflection member (reference reflection portion)
3 base plate
11 servo motor
12 processing tool
20 robot control unit
21 robot controller
23 memory device
23b operation program
23c calibration operation program
30 reflector support plate
31a, 31b, 31c reflector
40 measuring apparatus
41 laser head
41a laser beam emitting section
41b light receiving sensor
42 vertical axis motor (head driving device)
43 horizontal axis motor (head driving device)
50 measurement control unit
51 controller
53 memory device
53b measurement program (head drive control means)
53c coordinate relationship acquiring program (coordinate relationship acquisition means)
W workpiece

The invention claimed is:

1. A measurement system comprising: a reflector mounted at a distal end portion of a robot; and a measuring apparatus including a laser head which emits a laser beam toward the reflector and receives a reflected light from the reflector, and a head driving device which changes a direction of the laser head, wherein a position of the reflector mounted at the distal end portion of the robot is measured by the measuring apparatus, wherein the measuring apparatus comprises a controller, the controller is configured to conduct:
a coordinate relationship acquisition process which acquires a position and a direction of a coordinate system of the measuring apparatus with respect to a robot coordinate system, by emitting the laser beam from the laser head toward a reference reflection portion provided in a base portion of the robot, and based on a reflected light from the reference reflection portion; and
a head drive control process which receives, from a control unit for the robot, coordinate data in the robot coordinate system of the reflector, which is recognized by the control unit, the reflector being mounted at the distal end portion of the robot, wherein the control unit transmits, to the head driving device, a control command to change the direction of the laser head using the coordinate data which is received and the position and the direction of the coordinate system of the measuring apparatus with respect to the robot coordinate system;
wherein the reference reflection portion is used for setting the robot coordinate system when installing the robot.

* * * * *